US007392657B2

(12) United States Patent
Giacobbe

(10) Patent No.: US 7,392,657 B2
(45) Date of Patent: Jul. 1, 2008

(54) METHODS OF DISSOLVING OZONE IN A CRYOGEN

(75) Inventor: Frederick W. Giacobbe, Naperville, IL (US)

(73) Assignee: American Air Liquide, Inc., Fremont, CA (US)

( * ) Notice: Subject to any disclaimer, the term of this patent is extended or adjusted under 35 U.S.C. 154(b) by 394 days.

(21) Appl. No.: 11/148,038

(22) Filed: Jun. 8, 2005

(65) Prior Publication Data

US 2005/0274125 A1 Dec. 15, 2005

Related U.S. Application Data

(60) Provisional application No. 60/580,162, filed on Jun. 16, 2004, provisional application No. 60/578,576, filed on Jun. 9, 2004, provisional application No. 60/578,679, filed on Jun. 9, 2004.

(51) Int. Cl.

| | |
|---|---|
| ***F17C 11/00*** | (2006.01) |
| ***F17C 9/04*** | (2006.01) |
| ***B01D 53/56*** | (2006.01) |
| ***C01B 13/00*** | (2006.01) |

(52) U.S. Cl. .......................... 62/46.1; 62/600; 423/219

(58) Field of Classification Search .................. 62/46.1, 62/600; 423/219

See application file for complete search history.

(56) References Cited

U.S. PATENT DOCUMENTS

| | | | | |
|---|---|---|---|---|
| 1,937,832 A * | 12/1933 | McKee | 423/437.1 |
| 3,963,625 A | 6/1976 | Lowther | |
| 4,084,098 A | 4/1978 | Tabata et al. | |
| 4,100,421 A | 7/1978 | Tabata et al. | |
| 4,131,528 A | 12/1978 | Tsujimoto et al. | |
| 4,136,027 A | 1/1979 | Sakamoto et al. | |
| 4,167,484 A | 9/1979 | Morikawa | |
| 4,604,279 A | 8/1986 | Leitzke et al. | |
| 4,786,489 A | 11/1988 | Grenier et al. | |
| 4,863,497 A | 9/1989 | Grenier et al. | |
| 5,011,699 A * | 4/1991 | Mitsuda et al. | 426/320 |
| 5,232,886 A | 8/1993 | Yoshimoto et al. | |
| 5,324,734 A | 6/1994 | Gilbert et al. | |
| 5,730,783 A | 3/1998 | Sanui et al. | |
| 5,785,738 A | 7/1998 | Gastiger et al. | |
| 5,810,910 A | 9/1998 | Ludwig et al. | |
| 5,843,307 A | 12/1998 | Faivre et al. | |
| 5,846,298 A | 12/1998 | Weist, Jr. | |
| 5,888,271 A | 3/1999 | Tanimura et al. | |
| 6,030,598 A | 2/2000 | Topham et al. | |
| 6,083,464 A | 7/2000 | Tanimura et al. | |
| 6,190,436 B1 | 2/2001 | Ji et al. | |
| 6,197,091 B1 | 3/2001 | Ji et al. | |
| 6,214,199 B1 | 4/2001 | Izumi et al. | |
| 6,228,331 B1 | 5/2001 | Tanimura et al. | |
| 6,254,763 B1 | 7/2001 | Izumi et al. | |
| 6,277,248 B1 * | 8/2001 | Ishioka et al. | 204/176 |
| 6,315,962 B1 | 11/2001 | Tanimura et al. | |
| 6,344,130 B1 | 2/2002 | Koike et al. | |
| 6,495,109 B1 | 12/2002 | Tanimura et al. | |
| 6,528,024 B2 | 3/2003 | Izumi et al. | |
| 6,530,976 B2 | 3/2003 | Murai | |
| 6,555,072 B2 | 4/2003 | Izumi et al. | |
| 2001/0007304 A1 | 7/2001 | Izumi et al. | |
| 2001/0022135 A1 * | 9/2001 | Murai | 95/138 |
| 2001/0042691 A1 | 11/2001 | Izumi et al. | |
| 2002/0014419 A1 | 2/2002 | Murai | |
| 2003/0145727 A1 | 8/2003 | Murai | |
| 2004/0028576 A1 * | 2/2004 | Jain | 422/186.07 |

* cited by examiner

*Primary Examiner*—William C Doerrler
(74) *Attorney, Agent, or Firm*—Christopher J. Cronin

(57) ABSTRACT ozone is dissolved ozone in a liquid cryogen. A container containing a liquified cryogen is provided. A gaseous stream of ozone is allowed to flow into at least one adsorption unit containing an adsorbent material, thereby adsorbing ozone thereupon. The cryogen is allowed to flow from the container to the at least one adsorption unit and therethrough thereby extracting an amount of the ozone adsorbed upon the adsorbent material, wherein the cryogen is in either a liquid, gaseous or supercritical phase as it flows through the adsorption unit. ozone becomes dissolved in the cryogen.

27 Claims, No Drawings

METHODS OF DISSOLVING OZONE IN A CRYOGEN

CROSS-REFERENCE TO RELATED APPLICATIONS

This application claims the benefit under 35 U.S.C. § 119 (e) to Provisional Application Nos. 60/578,679, filed Jun. 9, 2004, 60/578,576, filed Jun. 9, 2004, and 60/580,162, filed Jun. 16, 2004, the entire contents of which are incorporated herein by reference.

BACKGROUND

It is known that certain solid adsorbent materials are capable of adsorbing appreciable quantities of ozone, especially at low temperatures, even if ozone concentrations are relatively low within another carrier gas. It is also well known that relatively pure liquid ozone can be produced at very low temperatures from gas mixtures containing ozone. However, very pure liquefied ozone, or highly concentrated solutions containing liquefied ozone, are extremely dangerous in that they are very unstable and tend to detonate.

SUMMARY OF THE INVENTION

Thus, an object of the invention is to provide a process that substantially avoids the initial production, use, or storage of liquefied ozone. Another object of the invention is to provide a process that enables the production of very high ozone solution concentrations within a liquid cryogen.

These and other objects are achieved according to the processes of the invention.

There is provided a method of dissolving ozone in a liquid cryogen, including the following steps. A container containing a liquified cryogen is provided. A gaseous stream of ozone is allowed to flow into at least one adsorption unit containing an adsorbent material, thereby adsorbing ozone thereupon. The cryogen is allowed to flow from the container to the at least one adsorption unit and therethrough, thereby extracting an amount of the ozone adsorbed upon the adsorbent material, wherein the cryogen is in either a liquid, gaseous or supercritical phase as it flows through the adsorption unit.

DESCRIPTION OF PREFERRED EMBODIMENTS

This invention allows production of ozone dissolved in a liquid cryogen. The process involves treating a solid adsorbent material (contained within an adsorption unit) with a gas stream including ozone and oxygen, or air. After the solid material has adsorbed a desired quantity of ozone, a stream of the cryogen in either the gaseous, liquid, or supercritical phase is allowed to flow into, and/or through the adsorbent material, where it extracts an amount of the adsorbed ozone. The resultant mixture of cryogen and ozone is then allowed to flow into a container, whose interior temperature and pressure are maintained at levels, such that the cryogen is maintained in the liquid phase. Nearly all of the ozone is dissolved therein, except for the portion that otherwise remains in the headspace above the liquid phase in the container.

In a first embodiment, the adsorption step may be performed continuously. In this case, a flow of the ozone containing gas stream from an ozone generator is allowed to flow through the adsorption unit. Any oxygen and non-adsorbed ozone is recycled to the ozone generator, where makeup oxygen or air is used in combination with the recycled gas to continuously generate the ozone containing gas.

In a second embodiment, the adsorption step may be performed batchwise. In this case, a flow of the ozone containing gas stream is allowed to flow into the adsorption unit until a desired pressure, and residence time are achieved. Then, the adsorption unit is vented to ambient.

In a third embodiment, the extraction step may be performed continuously. In this case, the flow of cryogen is continued into and through the adsorption unit until, essentially, all of the adsorbed ozone is extracted. The resultant cryogen/ozone mixture is then received by a container for containing the cryogen. The pressure and temperature of the container interior are maintained, such that the cryogen exists in the liquid state, in which case the ozone is at least partially dissolved therein. Any non-dissolved ozone remains in a headspace above the liquid phase in the container.

In a fourth embodiment, the extraction step may be performed batch-wise, wherein the cryogen is injected or pumped into the adsorption unit until a desired pressure and residence time is achieved, at which time the cryogen/ozone mixture may be vented into the container. Similar to the first embodiment, the pressure and temperature of the container interior are maintained such that the cryogen exists in the liquid state, in which case the ozone is at least partially dissolved therein. In this embodiment, the temperature of the adsorption unit is controlled such that the temperature, thereof after the extraction step, is adjusted if necessary to the temperature desired for the adsorption step.

In a fifth embodiment, production of the ozone and liquid cryogen mixture is performed continuously through a series of two or more adsorption units. While the adsorption step is performed in one of the adsorption units, the extraction is performed in a different adsorption unit, and vice versa.

In a sixth embodiment, liquid cryogen (and dissolved ozone, if any) from the container is used as the cryogen to extract the adsorbed ozone from the adsorption unit. In other words, the cryogen is recycled back to the original container containing the liquid cryogen. In this embodiment, the extraction step is repeated according to the fourth embodiment, or is continuously performed according to the third embodiment, until a desired level of ozone is obtained in the container containing the liquid cryogen and dissolved ozone.

In a seventh embodiment, portions of the liquid cryogen containing a desired amount of dissolved ozone (produced according to the sixth embodiment) are periodically allowed to flow to a secondary receiving container and makeup cryogen is introduced into the original source of cryogen. This is relatively useful when the concentration of dissolved ozone reaches a saturation level at which the cryogen flowing into or through the adsorption unit is not able to extract any more adsorbed ozone. By diverting at least a portion of the liquid cryogen/dissolved ozone mixture to a secondary container and introducing makeup cryogen, the ozone concentration is lowered below the saturation level.

Preferably, the ozone containing gas is produced by an ozone generator resulting in an ozone concentration of about 1% to about 6% by weight if the ozone is generated from air or about 2% to about 13% by weight if the ozone is generated from oxygen. The pressure and temperature of the generated gas and of the adsorption unit are controlled as necessary to maintain them at the desired temperature and pressure for performing the adsorption step. Preferably, the temperature of the ozone containing gas entering the adsorption unit, and of the adsorption unit itself, is at a relatively low temperature of from about −20° C. to +20° C. Preferably, the pressure of the ozone containing gas entering the adsorption unit, and of the adsorption unit itself, is at a pressure of from about 0.1 atm to about 10 atm. More preferably, the temperature of the ozone containing gas entering the adsorption unit and of the adsorption unit itself is less than 30° C.

The invention involves the use of moderately low temperature adsorbent beds deliberately operated under temperature, and/or pressure conditions that will not allow the formation of pure liquefied ozone. The critical temperature and critical pressure of pure ozone is ca. −12.1° C. (10.2° F.) and 55.0 atm (absolute). However, even under temperature conditions higher than the critical temperature of ozone and at partial pressures substantially less than 55.0 atm, appreciable quantities of ozone can still be adsorbed onto appropriate solid adsorbent materials. For example, Table 1 contains experimental and derived data that details approximate quantities of ozone that can be adsorbed onto a particular silica gel adsorbent (made by the Davison Chemical Company) at temperatures above and below the critical temperature of ozone.

TABLE 1

Ozone Adsorbed on Davison Silica Gel

| Temperature | Pounds Ozone/100 Pounds Silica Gel | |
|---|---|---|
| (° C.) | (at P = 10.3 mm Hg) | (at P = 15.9 mm Hg) |
| 25.0 | 0.04 | 0.07 |
| 0.0 | 0.09 | 0.15 |
| −10.0 | 0.13 | 0.21 |
| −40.0 | 0.45 | 0.72 |
| −78.5 | 3.00 | 4.50 |
| −90.0 | 6.00 | 8.00 |

Non-limiting examples of the cryogen include carbon dioxide, nitrogen, oxygen, argon, krypton, xenon, or other inert gases. More preferably, the cryogen is nitrogen or carbon dioxide. Preferably, it is contained within a bulk refrigerated storage vessel and serves as both a source of cryogen and the container receiving the cryogen/ozone mixture, such as that described in the sixth embodiment.

If the cryogen flowing into, and/or through the adsorption unit is in the liquid, supercritical, or gaseous phase, it may be at the same or higher temperature than employed during the adsorption step. If this extracting cryogen is warmer than the temperature employed during the adsorption step, the extraction will be accelerated and a more complete transfer of the adsorbed ozone into the cryogen will occur. If the desired extraction step temperature is indeed higher than the desired adsorption step temperature, the temperature of the ozone containing gas and/or adsorption unit is adjusted/controlled as necessary to bring the temperature(s) back to the desired range.

The adsorption unit includes entry and exit lines for entry and exit of the ozone-containing gas during the adsorption phase. Preferably, each of these lines includes one or more filter elements designed to keep the flowing ozonated gas stream free of particulate matter to an extent that avoids damaging the ozone generating process or any hardware to allow the ozonated gas stream to flow.

The adsorption unit also includes entry and exit lines for entry and exit of the cryogen during the extraction phase. Preferably, each of these lines includes one or more filter elements designed to keep the streams of cryogen and of the cryogen/ozone mixture free of particulate matter to an extent which avoids damaging any pumps or injectors through which those streams flows. While different entry lines are preferred for the ozone-containing gas and the cryogen entering/exiting the adsorption unit, it is within the scope of the invention to use one entry line to the adsorption unit which is connected to a manifold with suitable valves allowing either the ozone containing gas or the cryogen to enter the adsorption unit. Similarly, while different exit lines are preferred for the ozone-containing gas and the cryogen entering/exiting the adsorption unit, it is within the scope of the invention to use one exit line to the adsorption unit which is connected to a manifold with suitable valves allowing either the ozone containing gas or the cryogen to exit the adsorption unit.

Any material suitable for adsorbing ozone and being non-reactive with the cryogen of choice may be used in practice of the invention. Non-limiting examples of the adsorbent include silica gel adsorbent or silicate adsorbent (including mesoporous silicate), any type of mordenite (including high-silica mordenites), any type of molecular sieve, any type of zeolite or Zeolitic material (including cosilica penta zeolite, high-silica pentacile zeolite, and dealuminated Y zeolites), any type of faujasite (including deslumino faujasite and dealuminated faujasite), any type of activated alumina, any type of metal impregnated catalyst (e.g., $Pd/Al_2O_3$), any type of hopcalyte or hopcalyte type of material, any type of porous glass, any other type of conventional or unconventional adsorbent, or mixtures of foregoing. Initially and/or periodically, the adsorbent material may be regenerated by heating it and/or purging it with an inert purge gas to remove any undesired adsorbed impurities.

The adsorption unit may be placed either inside or outside of the liquid cryogen container.

For relatively large quantities of the liquid cryogen, the temperature and pressure conditions are typically maintained within containers by the use of mechanical refrigeration using more or less conventional freon-type refrigerants. Refrigeration coils are typically embedded inside of the vessel and the refrigeration system is activated automatically by transducers that sense elevated temperatures or pressures within these containers when "set point" temperature or pressure limits are exceeded. By this means, the internal storage tank temperatures/pressures of the liquid cryogen can be maintained indefinitely and "boil-off" losses are essentially eliminated.

The cryogen flowing into, and/or through the adsorbent bed may be maintained in the gaseous, liquid or supercritical fluid phase. When the liquid phase is desired, the cryogen introduced into the adsorption unit is preferably maintained at a temperature below its critical temperature and at a pressure needed to maintain the liquid phase at that temperature. When the gaseous phase is desired, the cryogen introduced into the adsorption unit is preferably maintained at a temperature above its critical temperature and at any desired pressure. When the supercritical fluid phase is desired, the cryogen introduced into the adsorption unit is preferably maintained at a temperature above its critical temperature and pressure. One of ordinary skill in the art will understand that the temperature of the cryogen entering the adsorption unit may be the same as, lower than, or higher than the temperature inside the adsorption unit.

While the stream of cryogen allowed to flow through the adsorbent bed may have a temperature higher than that in the container, the combination of the amount and temperature of the liquid cryogen in the container and the cooling ability of the refrigerant in the container are maintained such that any gas phase or supercritical phase cryogen contained in the flow of the combined ozone and cryogen from the adsorbent bed to the container is condensed as a liquid in that container and the ozone dissolves therein. One of ordinary skill in the art will understand that the pressure inside the container containing the mixture of ozone and cryogen must be maintained at a level below the critical temperatures of the cryogen.

One of ordinary skill in the art will understand that well known pumps, injectors, valves, tubing, etc. may be used to introduce the various streams of ozone-containing gas, cryogen, and cryogen containing ozone, into their respective destinations. Any equipment in direct contact with ozone or used to contain or store the liquid cryogen/dissolved ozone (e.g., cylinders, tanks, storage vessels, refrigerated storage vessels, piping and other "wetted" components, and the like) are preferably constructed of materials (or covered internally with some kind of passivation layer, e.g., a Teflon coating) selected such that the conversion of ozone (whether dissolved in the liquid cryogen or not) back into oxygen is inhibited.

Non-limiting examples of liquid cryogen containers include bulk storage vessels and liquified gas cylinders. Preferably, the container is a bulk storage vessel. Periodically, the headspace above the liquid cryogen and dissolved ozone phase is vented in order to release at least a portion of any non-dissolved oxygen therein.

The normal temperature and pressure storage conditions for relatively large quantities of some liquid cryogens (such as carbon dioxide in bulk refrigerated storage vessels) are typically maintained within bulk liquid storage vessels by the use of mechanical refrigeration using more or less conventional freon type refrigerants. Refrigeration coils are typically embedded inside of the vessel and the refrigeration system is activated automatically by transducers that sense elevated temperatures or pressures within these storage tanks when "set " point temperature or pressure limits are exceeded. By this means, the internal storage tank temperatures and/or pressures of the liquid cryogen can be maintained indefinitely and "boil-off" losses are essentially eliminated.

The point of this is that it is relatively easy to control and maintain the temperature and pressure of the liquid cryogen in any closed system, even if the liquid cryogen is caused to circulate in some type of insulated piping "loop" and sub-system and even if that piping loop and sub-system is an internal or external part of the main liquid cryogen storage vessel. In addition, if some of the original liquefied cryogen is withdrawn from a main bulk storage vessel and is then converted into a gas or heated above its critical temperature, that portion of the cryogen can be used to extract ozone from an adsorption system. That mixture, still consisting primarily of the cryogen, can then be re-injected back into the main bulk liquid storage tank whereupon it will cool and condense back into the liquid phase, and practically all of the ozone extracted from the adsorption system will end up dissolved within the liquefied cryogen, except for of course any ozone remaining in the gaseous phase in the headspace above the liquid cryogen.

THEORETICAL EXAMPLES: CARBON DIOXIDE

The adsorbed amounts of ozone tabulated in Table 1 are a direct function of the ozone equilibrium partial pressure in the gas phase above the solid adsorbent. For example, if the ozone partial pressure in an oxygen carrier gas passing through a silica gel adsorption bed is 10.3 mm Hg, and if the silica gel adsorption bed/gas phase system is held at 0.0° C., then ca. 0.09 lb of ozone will be adsorbed per 100 lb of the silica gel. If, at some later time, liquid or supercritical, or gaseous carbon dioxide (obtained from a bulk refrigerated carbon dioxide storage vessel) is circulated through this adsorption system and then returned to the bulk storage vessel wherein re-liquefaction occurs (if necessary), that fluid will be able to extract essentially all of this adsorbed ozone. Repeated cyclical operation of this process (namely: adsorption followed by extraction) can be used to increase the concentration of ozone in the circulated carbon dioxide. In the case of liquefied carbon dioxide, the maximum quantity of ozone that can be dissolved in this fluid will depend on the overall solubility of ozone in the liquid carbon dioxide at the specific operating system temperatures and pressures employed within a bulk carbon dioxide storage system.

If a fluid consisting primarily of liquid, or supercritical, or gaseous carbon dioxide is circulated through an adsorption system containing pre-adsorbed ozone, this fluid may be at the same temperature or it may even be warmer than the original temperature employed during the adsorption step. If this extracting fluid is warmer than the temperature employed during the adsorption step, the desorption process will be accelerated and a more complete transfer of the adsorbed ozone into the fluid phase of the carbon dioxide will occur. For example, liquid carbon dioxide is normally stored at ca. −17.8° C. (ca. 0.0° F.) and 21.4 atm abs. (ca. 300 Psig), so this temperature and pressure condition may be chosen for use during the carbon dioxide circulation/extraction process. However, if supercritical or gaseous carbon dioxide at somewhat higher temperatures (i.e., above 31.1° C.) is employed during the ozone extraction process, practically all of the adsorbed ozone will be transferred into the supercritical or gaseous carbon dioxide fluid phase at an even faster rate. If this supercritical or gaseous mixture is then cooled and condensed back into liquid carbon dioxide, practically all of the extracted ozone will end up in the liquid phase of the carbon dioxide (except for the ozone that ends up in the gas phase above the liquefied carbon dioxide).

Example 1-A

If 100 lb of a silica gel adsorbent, maintained at −20° C., is exposed to a flowing gas stream mixture containing ozone having a partial pressure of 10.3 mm Hg and oxygen having a partial pressure of 749.7 mm Hg for a sufficient period of time, the silica gel will adsorb a maximum of about 0.18 lb of ozone (estimated from data listed in Table 1). Extending the exposure time between the flowing ozone/oxygen mixture (under these fixed temperature and pressure conditions) will not increase the amount of ozone adsorbed any further. So, once this level of adsorbed ozone is reached, the adsorption process can be discontinued.

If 1000 lb of liquid carbon dioxide (from a fixed volume liquid storage system, maintained at ca. −17.8° C. and 21.4 atm) is circulated through the ozone saturated adsorption bed (noted above), about 0.18 lb of ozone will be extracted by the liquefied carbon dioxide. If the ullage volume in the main liquid carbon dioxide storage system is kept to a minimum, almost all of the extracted ozone will end up dissolved within the liquid carbon dioxide. In this single cycle extraction case, the concentration of dissolved ozone within the liquid carbon dioxide will be about 180 ppm by weight. If this process is carried out cyclically 10 times (without any significant losses in the original quantity of carbon dioxide), the ozone concentration in the liquid carbon dioxide will approach about 1,800 ppm by weight.

Example 1-B

If 100 lb of a silica gel adsorbent, maintained at −20° C., is exposed to a flowing gas stream mixture containing ozone having a partial pressure of 15.9 mm Hg and oxygen having a partial pressure of 744.1 mm Hg for a sufficient period of time, the silica gel will adsorb a maximum of about 0.30 lb of ozone (estimated from data listed in Table 1). Extending the exposure time between the flowing ozone/oxygen mixture (under these fixed temperature and pressure conditions) also will not increase the amount of ozone adsorbed any further. So, once this level of adsorbed ozone is reached, the adsorption process can be discontinued.

A relatively small quantity of supercritical carbon dioxide can be created by pumping or extracting (from a large liquid carbon dioxide storage tank initially containing 1000 lb of liquefied carbon dioxide) about 50 lb of liquid carbon dioxide into a smaller external pressure vessel and then heating that trapped quantity of carbon dioxide to a temperature above its critical temperature and critical pressure. If that heated quantity of supercritical carbon dioxide is then directed through the ozone saturated adsorption bed (noted above) and then injected back into the bulk storage tank containing the original liquefied carbon dioxide, about 0.30 lb of ozone will be extracted by the 50 lb quantity of supercritical carbon dioxide. If the ullage volume in the main liquid carbon dioxide storage system is kept to a minimum, almost all of the extracted ozone will end up dissolved within the original bulk liquid carbon dioxide source. In a single cycle extraction case, the overall concentration of dissolved ozone within the bulk liquid carbon dioxide storage vessel will be about 300 ppm by weight. If this process is carried out cyclically 10 times (without any significant losses in the original quantity of carbon dioxide), the ozone concentration in the original bulk supply of liquid carbon dioxide will approach about 3,000 ppm by weight.

Example 1-C

If 100 lb of a silica gel adsorbent, maintained at −40° C., is exposed to a flowing gas stream mixture containing ozone having a partial pressure of 15.9 mm Hg and oxygen having a partial pressure of 744.1 mm Hg for a sufficient period of time, the silica gel will adsorb a maximum of about 0.72 lb of ozone (estimated from data listed in Table 1). Extending the exposure time between the flowing ozone/oxygen mixture (under these fixed temperature and pressure conditions) also will not increase the amount of ozone adsorbed any further. So, once this level of adsorbed ozone is reached, the adsorption process can be discontinued.

A relatively small quantity of supercritical carbon dioxide can be created by pumping or extracting (from a large liquid carbon dioxide storage tank initially containing 1000 lb of liquefied carbon dioxide) about 50 lb of liquid carbon dioxide into a smaller external pressure vessel and then heating that trapped quantity of carbon dioxide to a temperature above its critical temperature and critical pressure. If that heated quantity of supercritical carbon dioxide is then directed through the ozone saturated adsorption bed (noted above) and then injected back into the bulk storage tank containing the original liquefied carbon dioxide; about 0.72 lb of ozone will be extracted by the 50 lb quantity of supercritical carbon dioxide. If the ullage volume in the main liquid carbon dioxide storage system is kept to a minimum, almost all of the extracted ozone will end up dissolved within the original bulk liquid carbon dioxide source. In a single cycle extraction case, the overall concentration of dissolved ozone within the bulk liquid carbon dioxide storage vessel will be about 720 ppm by weight. If this process is carried out cyclically 10 times (without any significant losses in the original quantity of carbon dioxide), the ozone concentration in the original bulk supply of liquid carbon dioxide will approach about 7,200 ppm by weight.

In all of the examples noted above, it should be understood that all heat input (either deliberate or unintentional) into circulating streams (or extracted/injected streams) of liquefied carbon dioxide, or supercritical carbon dioxide, or gaseous carbon dioxide can be compensated for by pre-existing refrigeration systems normally installed within bulk source tanks containing large volumes of liquefied carbon dioxide. Therefore, if a warmer, slightly ozonated, liquid carbon dioxide mixture is injected into a lower temperature bulk carbon dioxide storage system, this process will cause the internal bulk tank refrigeration system to begin and continue operating until the bulk storage system set-point temperature has been achieved. If a supercritical mixture of ozone and carbon dioxide, or a gaseous mixture of ozone and carbon dioxide, is injected into a lower temperature bulk carbon dioxide storage system, this process will also cause the internal bulk tank refrigeration system to begin and continue operating until the bulk storage system set-point temperature has been achieved. During this process, the supercritical or gaseous ozone/carbon dioxide mixtures will also condense back into liquid phase mixtures consisting primarily of ozone dissolved in liquid carbon dioxide.

It should also be understood that modern ozone generation systems are capable of producing higher ozone concentrations, at higher partial pressures than are listed in Table 1. In addition, there are many other types of ozone adsorbent materials currently available that are capable of adsorbing significantly more ozone under the same adsorbent temperature and ozone partial pressure conditions (per unit mass or weight) than silica gel adsorbents. Therefore, all estimates of ozone loadings in the examples cited in the text above are believed to be conservative.

Other temperature and pressure conditions during adsorption or extraction steps described in this disclosure can be employed to increase or decrease dissolved ozone concentrations within finally stored liquid carbon dioxide systems. It is not the intent or purpose of this disclosure to attempt to describe all of these possibilities but only to illustrate that many possible outcomes are achievable.

THEORETICAL EXAMPLES: OTHER CRYOGENIC FLUIDS

As noted above, the adsorbed amounts of ozone tabulated in Table 1 are a direct function of the ozone equilibrium partial pressure in the gas phase above the solid adsorbent. So, if the ozone partial pressure in an oxygen carrier gas passing through a silica gel adsorption bed is 10.3 mm Hg, and if the silica gel adsorption bed/gas phase system is held at 0.0° C., then ca. 0.09 lb of ozone will be adsorbed per 100 lb of the silica gel. If, at some later time, gaseous nitrogen (obtained from a bulk liquid nitrogen storage vessel) is circulated through this adsorption system and then returned to the bulk storage vessel wherein re-liquefaction can occur, that fluid will be able to extract essentially all of this adsorbed ozone. It is understood that re-liquefaction of the ozone/nitrogen gas mixture, within the bulk storage vessel, will only occur if the ozone/nitrogen gas mixture is compressed and cooled before or during its injection into the bulk storage tank and that this process may cause the vaporization of some of the original quantity of liquid in that storage vessel. In any case, repeated cyclical operation of this process (namely: adsorption followed by extraction) can be used to increase the concentration of ozone in the circulated nitrogen even if some of the original liquid nitrogen is lost as a consequence of the re-liquefaction process. In the case of liquid nitrogen, the maximum quantity of ozone that can be dissolved in this fluid will depend on the overall solubility of ozone in the liquid nitrogen at the specific operating system temperatures and pressures employed within a bulk liquid nitrogen storage system. Some oxygen may also dissolve in the liquid nitrogen as a result of this process due to the residual oxygen remaining within the adsorption system just before the gaseous nitrogen extraction process begins.

If a fluid consisting primarily of gaseous nitrogen is pumped or injected through an adsorption system containing pre-adsorbed ozone, this fluid may be at the same temperature or it may even be warmer than the original temperature employed during the adsorption step. If this extracting fluid is warmer than the temperature employed during the adsorption step, the desorption process will be accelerated and a more complete transfer of the adsorbed ozone into the fluid phase of the nitrogen will occur. For example, liquid nitrogen is typically stored in bulk systems at temperatures somewhat higher than its normal boiling point (ca. 77.4 K) and at pressures in the range of ca. 50 to 200 Psig. However, if some of the liquid nitrogen is extracted from a bulk storage system and heated and vaporized, that warmer fluid may be used during the ozone extraction process within the ozone adsorption system. Then, the ozone/nitrogen gas mixture can be compressed and injected back into the original liquid nitrogen storage tank whereupon it will re-liquefy and at the same time deliver practically all of the extracted ozone into the entire vessel storing the bulk quantity of liquid nitrogen. A dilute solution of ozone in liquid nitrogen will be the result of this process. However, repeating this process many times will allow the ozone concentration within the liquid nitrogen to increase even further.

Example 2

If 100 lb of a silica gel adsorbent, maintained at −90° C., is exposed to a flowing gas stream mixture containing ozone having a partial pressure of 15.9 mm Hg and oxygen having a partial pressure of 744.1 mm Hg for a sufficient period of time, the silica gel will adsorb a maximum of about 8.0 lb of ozone (estimated from data listed in Table 1). Extending the exposure time between the flowing ozone/oxygen mixture (under these fixed temperature and pressure conditions) also will not increase the amount of ozone adsorbed any further. So, once this level of adsorbed ozone is reached, the adsorption process can be discontinued.

A relatively large quantity of gaseous nitrogen (about 931 SCF) can be created by pumping or extracting (from a large liquid nitrogen storage tank, initially containing 1000 gal liquid nitrogen) about 10 gal of liquid nitrogen into a smaller external pressure vessel and then heating that trapped quantity of liquid nitrogen to ambient temperatures. If that heated quantity of gaseous nitrogen is then directed through the ozone saturated adsorption bed (noted above), and then injected back into the bulk storage tank containing the original liquid nitrogen, about 8.0 lb of ozone will be extracted by the 931 SCF of gaseous nitrogen and end up dissolved within the liquid nitrogen. However, recompressing, condensing, and re-liquefying the gaseous ozone/nitrogen mixture (within a heat exchanger located inside of the liquid nitrogen tank) will cause a little more than 10 gal of the original bulk liquid nitrogen to vaporize, and possibly be lost from the bulk storage tank. So, the final volume of liquid nitrogen in the bulk tank will have been reduced down from the original 1000 gal to about 990 gal. Therefore, the ozone concentration (assuming that it is all trapped in the remaining liquid nitrogen) will be about 8.0 lb per 990 gal of liquid nitrogen or about 1,200 ppm of ozone by weight will exist in the remaining liquid nitrogen. If this entire process is repeated several times it is easy to see that very high concentrations of ozone in liquid nitrogen can be produced. For example, if two more cycles of this process are executed, about 24 lb of ozone will be transferred into about 970 gal of remaining liquid nitrogen. So, the final ozone concentration after these steps will be about 3,666 ppm of ozone by weight in the remaining liquid nitrogen.

In the example noted immediately above, it should be understood that part of the heat needed to vaporize the extracted liquid nitrogen can come from the adsorption system (through an appropriate heat exchanger) and thus cooling of the adsorption system (prior to the ozone adsorption process) can be partially or completely accomplished by using the cooling power available in the extracted liquid nitrogen.

As noted earlier, modern ozone generation systems are capable of producing higher ozone concentrations, at higher partial pressures than are listed in Table 1. In addition, there are many other types of ozone adsorbent materials currently available that are capable of adsorbing significantly more ozone under the same adsorbent temperature and ozone partial pressure conditions (per unit mass or weight) than silica gel adsorbents. Therefore, all estimates of ozone loadings in the examples cited in the text above are believed to be conservative.

Other temperature and pressure conditions during adsorption, or extraction steps described in this disclosure can be employed to increase or decrease dissolved ozone concentrations within, finally stored liquids such as liquid nitrogen, liquid oxygen, and liquid argon. It is not the intent or purpose of this disclosure to attempt to describe all of these possibilities but only to illustrate that many possible outcomes are achievable.

While this disclosure presents no specific examples utilizing oxygen, argon, krypton, or xenon as the cryogen, it is believed that the processes described in the above examples will achieve similar results using these other cryogens.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and other embodiments of the integrated processes and apparatus may be employed without departing from the true scope of the invention defined in the following claims. The present invention also includes any combination of one or more of the embodiments described above such that, in light of this Specification, one of ordinary skill in the art would understand that any such combined embodiments are not inconsistent with another.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of dissolving ozone in a liquid cryogen, comprising the steps of:

a) providing a liquified cryogen;

b) allowing a gaseous stream of ozone to flow into at least one adsorption unit containing an adsorbent material thereby adsorbing ozone thereupon;

c) allowing the cryogen to flow to the at least one adsorption unit, thereby extracting an amount of the ozone adsorbed upon the adsorbent material in step (b), wherein the cryogen is in either a liquid, gaseous or supercritical phase as it flows through the adsorption unit;

d) allowing a majority of the combined cryogen and extracted ozone from step (c) to flow from the at least one adsorption unit to a container, wherein a pressure and temperature of the cryogen are maintained at levels such that the cryogen is maintained in the liquid state:

e) allowing another stream of gaseous ozone to flow into the at least one adsorption unit containing an adsorbent material thereby adsorbing ozone thereupon;

f) allowing at least a portion of the cryogen with dissolved ozone to flow to the at least one adsorption unit, thereby extracting an amount of the ozone adsorbed upon the adsorbent material in step (e); and g) allowing a majority of the combined cryogen and extracted ozone from step (f) to flow out of the at least one adsorption unit.

2. The method of claim 1, wherein the cryogen is in the liquid phase as it flows through the at least one adsorption unit.

3. The method of claim 1, wherein the container is a bulk refrigerated storage vessel.

4. The method of claim 3, wherein the at least one adsorption unit is disposed within the storage vessel.

5. The method of claim 3, wherein the at least one adsorption unit is disposed outside of the storage vessel.

6. The method of claim 1, further comprising the step of:

a) controlling a temperature within the storage vessel below a critical temperature of the liquid cryogen in a purified state and below a critical temperature of the resultant dissolved ozone and liquid cryogen combination contained within the storage vessel.

7. The method of claim 1, further comprising the step of:

a) controlling a temperature inside the at least one adsorption unit to less than 300° C.

8. The method of claim 1, further comprising the steps of:

a) maintaining the stream of gaseous ozone within the at least one adsorption unit for a period of time to achieve a desired amount of adsorbed ozone;

b) allowing a combination of the extracted ozone and at least some of the cryogen within the adsorption unit to flow out of the at least one adsorption unit; and c) venting a non-adsorbed portion of the gaseous ozone and any remaining portion of the cryogen from the at least one adsorption unit after the period of time expires.

9. The method of claim 8, further comprising the steps of:

a) allowing the stream of gaseous ozone to flow through at least one filter upstream of the at least one adsorption unit to filter out at least some particulate matter contained within the gaseous ozone stream; and b) allowing the stream of gaseous ozone vented from the at least one adsorption unit to flow through at least one filter to filter out at least some particulate material contained within the vented gaseous ozone stream.

10. The method of claim 1, further comprising the steps of:

a) allowing the cryogen flowing from the container to flow through at least one filter upstream of the at least one adsorption unit to filter out at least some particulate matter contained within the cryogen; and b) allowing the combined cryogen and extracted ozone to flow through at least one filter downstream of the at least one adsorption unit to filter out particulate material contained within the combined cryogen and extracted ozone.

11. The method of claim 1, wherein the adsorbent material is selected from the group consisting of:

a) silica gels;
b) silicates;
c) mesoporous silicates;
d) mordenites;
e) high-silica mordenites;
f) molecular sieves;
g) zeolites;
h) zeolitic materials;
i) cosilica penta zeolites;
j) high-silica pentacile zeolites;
k) dealuminated Y zeolites;
l) faujasites;
m) deslumino faujasites;
n) dealuminated faujasites;
o) activated aluminas;
p) metal impregnated catalysts;
q) $Pd/Al_2O_3$ catalyst materials;
r) hopcalytes;
s) porous glass; and
t) mixtures thereof.

12. The method of claim 1, further comprising the steps of:

a) generating the stream of ozone from an ozone generator, the stream of ozone containing ozone and oxygen; and b) recirculating the stream of ozone from the ozone generator to the at least one adsorption unit and back to the ozone generator for a period of time to achieve a desired amount of ozone to be adsorbed upon the adsorbent material.

13. The method of claim 1, further comprising the step of:

a) maintaining the flow of the cryogen to the at least one adsorption unit for a period of time, wherein a temperature of the cryogen flowing to the at least one adsorption unit is higher than a temperature of the at least one adsorption unit during the period of time.

14. The method of claim 1, further comprising the step of:

a) maintaining the flow of the cryogen to the at least one adsorption unit for a period of time, wherein a temperature of the cryogen flowing to the at least one adsorption unit is lower than a temperature of the at least one adsorption unit during the period of time.

15. The method of claim 1, further comprising the step of:

a) maintaining the flow of the cryogen to the at least one adsorption unit for a period of time, wherein a temperature of the cryogen flowing to the at least one adsorption unit is the same as a temperature of the at least one adsorption unit during the period of time.

16. The method of claim 1, further comprising the step of:

a) regenerating the at least one adsorption unit to remove undesirable amounts of substances adsorbed upon the adsorbent material, wherein the regeneration is achieved by heating the adsorbent material and/or purging the at least one adsorption unit with a purge gas.

17. The method of claim 1, wherein the liquid cryogen is selected from the group consisting of:

a) carbon dioxide;
b) nitrogen;
c) oxygen;
d) argon;
e) krypton;
f) xenon;
g) inert gases; and
h) mixtures thereof.

18. The method of claim 1, wherein the liquid cryogen is nitrogen or carbon dioxide.

19. The method of claim 3, wherein portions of the cryogen containing dissolved ozone are allowed to flow to a container separate from the storage vessel.

20. The method of claim 1, wherein the at least one adsorption unit comprises more than one adsorption units.

21. A method of dissolving ozone in a liquid cryogen, comprising the steps of:

a) providing a bulk refrigerated storage vessel containing a liquid cryogen;

b) providing at least first and second adsorption units, wherein the first and second adsorption units contain an adsorbent material for adsorbing ozone;

c) providing a source of gaseous ozone;

d) allowing the gaseous ozone to flow through the first adsorption unit thereby adsorbing at least some of the gaseous ozone therein;

e) discontinuing the flow of gaseous ozone through the first adsorption unit;

f) venting any non-adsorbed portion of gaseous ozone in the first adsorption unit out of the first adsorption unit;

g) allowing the cryogen to flow from the vessel through the first adsorption unit and back to the vessel thereby extracting at least some of the ozone adsorbed in the first adsorption unit and dissolving the extracted ozone in the liquid cryogen in the vessel;

h) allowing the gaseous ozone, as the cryogen is flowing through the first adsorption unit, to flow through the second adsorption unit thereby adsorbing at least some of the gaseous ozone therein;

i) discontinuing the flow of gaseous ozone through the second adsorption unit;

j) venting any non-adsorbed portion of gaseous ozone in the second adsorption unit out of the second adsorption unit;

k) discontinuing the flow of the cryogen through the first adsorption unit; and l) repeating steps d through k until a desired amount of ozone is dissolved in the liquid cryogen in the vessel.

22. The method of claim 21, further comprising the step of:

a) regenerating the first and second adsorption units to remove undesirable amounts of substances adsorbed upon the adsorbent materials therein, the regeneration being achieved by heating the adsorbent material and/or purging the adsorption units with a purge gas.

23. The method of claim 21, wherein the adsorption units are disposed within the vessel.

24. The method of claim 21, wherein the adsorption units are disposed outside of the vessel.

25. The method of claim 21, wherein the liquid cryogen is selected from the group consisting of:

a) carbon dioxide;
b) nitrogen;
c) oxygen;
d) argon;
e) krypton;
f) xenon;
g) inert gases; and
h) mixtures thereof.

26. The method of claim 21, wherein the liquid cryogen is nitrogen or carbon dioxide.

27. The method of claim 21, wherein the adsorbent material is selected from the group consisting of:

a) silica gels;
b) silicates;
c) mesoporous silicates;
d) mordenites;
e) high-silica mordenites;
f) molecular sieves;
g) zeolites;
h) zeolitic materials;
i) cosilica penta zeolites;
j) high-silica pentacile zeolites;
k) dealuminated Y zeolites;
l) faujasites;
m) deslumino faujasites;
n) dealuminated faujasites;
o) activated aluminas;
p) metal impregnated catalysts;
q) Pd/$Al_2O_3$ catalyst materials;
r) hopcalytes;
s) porous glass; and
t) mixtures thereof.

* * * * *

UNITED STATES PATENT AND TRADEMARK OFFICE

CERTIFICATE OF CORRECTION

PATENT NO. : 7,392,657 B2

APPLICATION NO. : 11/148038
DATED : July 1, 2008
INVENTOR(S) : Frederick W. Giacobbe It is certified that error appears in the above-identified patent and that said Letters Patent is hereby corrected as shown below:

In Column 11, line 36, replace "300 C" with --30 C--.

Signed and Sealed this

Thirteenth Day of April, 2010

David J. Kappos
*Director of the United States Patent and Trademark Office*